(12) United States Patent
Fujinoki (10) Patent No.: US 11,223,065 B2
(45) Date of Patent: Jan. 11, 2022

(54) SOLID ELECTROLYTE CONTAINING METAL HALIDE CONTAINING ALKALINE-EARTH METAL AND GROUP 13 METAL, AND FILLER, AND SECONDARY BATTERY INCLUDING SOLID ELECTROLYTE

(71) Applicant: Panasonic Intellectual Property Management Co., Ltd., Osaka (JP)

(72) Inventor: Norihito Fujinoki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 202 days.

(21) Appl. No.: 16/149,131

(22) Filed: Oct. 2, 2018

(65) Prior Publication Data

US 2019/0123383 A1    Apr. 25, 2019

(30) Foreign Application Priority Data

Oct. 19, 2017  (JP) .............................. JP2017-202289

(51) Int. Cl.
| | | |
|---|---|---|
| *H01M 10/0562* | (2010.01) | |
| *H01M 6/18* | (2006.01) | |
| *H01M 8/1016* | (2016.01) | |
| *H01M 8/10* | (2016.01) | |
| *H01M 10/0525* | (2010.01) | |
| *H01M 10/052* | (2010.01) | |
| *H01M 10/054* | (2010.01) | |

(52) U.S. Cl.
CPC ..... *H01M 10/0562* (2013.01); *H01M 10/052* (2013.01); *H01M 10/054* (2013.01); *H01M 10/0525* (2013.01); *H01M 2300/008* (2013.01)

(58) Field of Classification Search
None
See application file for complete search history.

(56) References Cited

U.S. PATENT DOCUMENTS

2001/0049060 A1    12/2001  Aurbach et al.
2012/0115028 A1*    5/2012  Ueno ................. H01M 10/0525
                                                                  429/209
2014/0205909 A1    7/2014  Yonehara et al.

FOREIGN PATENT DOCUMENTS

| JP | 2003-512704 | 4/2003 |
| JP | 2014-029818 | 2/2014 |
| JP | 2017-130448 | 7/2017 |
| WO | 2016/136924 | 9/2016 |

OTHER PUBLICATIONS

Dissanayake et al., Thermal and electrical properties of solid polymer electrolyte PEO9 Mg(ClO4)2 incorporating nano-porous Al2O3 filler, V. 177 Iss. 3-4 Solid St. Ionics 343-46 (2006) (Year: 2006).*

(Continued)

*Primary Examiner* — Yoshitoshi Takeuchi
(74) *Attorney, Agent, or Firm* — McDermott Will and Emery LLP (57) ABSTRACT

A solid electrolyte includes a matrix including, as a salt, containing a metal halide containing an alkaline-earth metal and a metal, and at least one filler located in the matrix.

14 Claims, 3 Drawing Sheets

(56) References Cited

OTHER PUBLICATIONS

Tomita et al, Synthesis of MgM 2X8 (M=Al, Ga; X=Cl, Br) and its structure and magnesium ion conduction, Annual Mtg. of Jpn. Soc. Mol. Sci. (2015) (Year: 2015).*

M.A.K.L. Dissanayake et al., "Thermal and Electrical Properties of Solid Polymer Electrolyte PEO9Mg(Cl04)2 Incorporating Nano-Porous Al2O3 Filler", Solid State Ionics 177, Jan. 31, 2006, pp. 343-346.

Yasumasa Tomita et al., "Synthesis, crystal structure, and Mg-ion conductivity of MgM2X8 (M=Al,Ga ; X=Cl,Br)", Annual Meeting of Japan Society for Molecular Science 2015 presentation abstract No. 1P024, Aug. 31, 2015 Internet<URL: http://molsci.center.ims.ac.jp/area/2015/PDF/poster_1_en.html>.

\* cited by examiner

SOLID ELECTROLYTE CONTAINING METAL HALIDE CONTAINING ALKALINE-EARTH METAL AND GROUP 13 METAL, AND FILLER, AND SECONDARY BATTERY INCLUDING SOLID ELECTROLYTE

BACKGROUND

1. Technical Field

The present disclosure relates to a solid electrolyte and a secondary battery including the solid electrolyte.

2. Description of the Related Art

In recent years, multivalent ion-conducting secondary batteries have been expected to be put into practical use. Among these batteries, magnesium secondary batteries have a higher theoretical capacity density than lithium ion batteries in the related art.

M.A.K.L. Dissanayake et al. ("Thermal and Electrical Properties of Solid Polymer Electrolyte $PEO_9Mg(ClO_4)_2$ Incorporating Nano-Porous $Al_2O_3$ Filler" Solid State Ionics 177 (2006) 343-346) disclose a polymer electrolyte produced by dissolving magnesium perchlorate $(Mg(ClO_4)_2)$ in a poly(ethylene oxide) (PEO) and adding $Al_2O_3$ thereto.

Yasumasa Tomita et al. ("Synthesis, crystal structure and Mg ionic conductivity of $MgM_2X_8$ (M=Al, Ga; X=Cl, Br)" 1P024, Annual Meeting of Japan Society for Molecular Science, September, 2015) disclose an electrolyte represented by $MgGa_2Cl_{8-x}Br_x$ (x=0 to 7).

SUMMARY

In one general aspect, the techniques disclosed here feature a solid electrolyte including a matrix including, as a solid salt, a metal halide containing an alkaline-earth metal and a group 13 metal, and at least one filler located in the matrix.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

A solid electrolyte according to an embodiment will be described in detail below with reference to the attached drawings.

The following descriptions indicate the comprehensive or specific embodiments. The numerical values, compositions, shapes, thickness, and structures and electrode materials of secondary batteries described below are merely examples and are not intended to limit the scope of the present disclosure. Furthermore, elements that are not described in independent claims representing the broadest concept are described as optional elements.

While a solid electrolyte used for a secondary battery will be mainly described below, the applications of the solid electrolyte according to the present disclosure are not limited thereto. The solid electrolyte may be used for, for example, an electrochemical device such as an ion-concentration sensor.

Hereinafter, for convenience of description, "a metal halide containing an alkaline-earth metal and a group 13 metal" is also referred to simply as a "metal halide".

EMBODIMENTS

1. Solid Electrolyte

1-1. Structure of Solid Electrolyte

Figures 1, 2A:
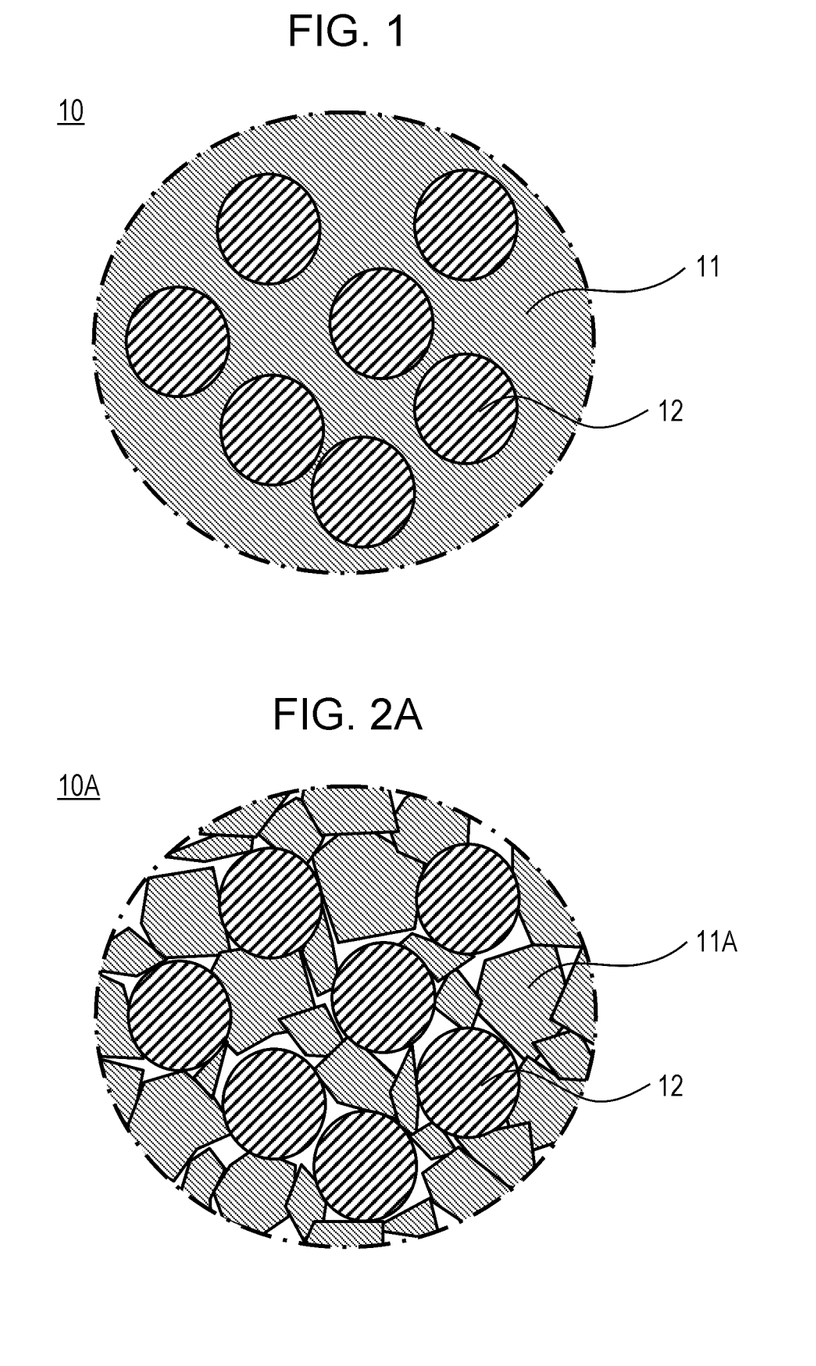
FIG. 1 is an enlarged schematic cross-sectional view of an example of the structure of a solid electrolyte according to an embodiment.
FIG. 2A is a schematic cross-sectional view of the structure of a solid electrolyte according to a first modification of an embodiment.

FIG. 1 illustrates an example of the structure of a solid electrolyte 10 according to this embodiment. FIG. 1 illustrates a region of a portion of a cross section of the solid electrolyte 10. The solid electrolyte 10 includes a matrix 11 and particles of an inorganic oxide filler 12. The matrix 11 contains, as a solid electrolyte, a metal halide containing an alkaline-earth metal and a group 13 metal. In FIG. 1, the inorganic oxide filler 12 is formed of fine particles and dispersed in the matrix 11.

Typically, alkaline-earth metal salts tend to have an extremely low or no ionic conductivity. This is because divalent alkaline-earth metal ions have high electrostatic interactions with surrounding anions, compared with monovalent alkali metal ions such as lithium ions.

In contrast, the solid electrolyte 10 according to this embodiment can have good alkaline-earth metal ion conductivity as described in various examples below. Possible reasons for this are described below.

First, the group 13 metal has a higher electronegativity than alkaline-earth metals and easily attracts electrons. Thus, the group 13 metal can attract the charge of surrounding halogen ions to promote the dissociation of alkaline-earth metal ions.

Second, the inorganic oxide filler 12 is in contact with the matrix 11 to form interfaces between the inorganic oxide and the metal halide. In the case where vacancies of alkaline-earth metal ions exist at the interfaces, it is presumed that the network of the vacancies, which are located adjacent to each other, serve as paths of the alkaline-earth metal ions. Alternatively, in the case where space-charge layers are formed in the vicinities of the interfaces by the alkaline-earth metal ions and the metal halide anions, it is presumed that the network of the space-charge layers, which are continuously formed along the surfaces of particles of the inorganic oxide filler 12, serve as paths of the alkaline-earth metal ions. In any of these cases, the inorganic oxide filler 12 can promote the movement of the alkaline-earth metal ions.

The solid electrolyte 10 is in the form of, for example, a layer. The layer has a thickness of, for example, 1 μm or more and 50 μm or less. This can secure safety such as short-circuit protection, while reducing resistance to the conduction of the alkaline-earth metal ions. For example, in the case where the solid electrolyte 10 has an ionic conductivity of $1 \times 10^{-5}$ S/cm and a thickness of 5 μm, the solid electrolyte 10 can have a resistance per unit area of 50 Ω·cm$^2$ or less.

1-2. Matrix

The matrix 11 contains, as a solid salt, the metal halide containing the alkaline-earth metal and the group 13 metal. The term "solid salt" used in present disclosure refers to a salt present in the form of a solid and is different from a salt dissolved in a solvent or polymer.

The matrix 11 contains, as a main component, the metal halide containing the alkaline-earth metal and the group 13 metal. The term "main component" used in the present disclosure refers to a component that accounts for more than 50 wt % of the matrix. This can result in an increased concentration of the alkaline-earth metal ions in the matrix 11 and improved ionic conductivity in the solid electrolyte. The matrix 11 may have a metal halide content of more than 80 wt % and even more than 95 wt %. Note that in reports of matrices in which metal salts are dissolved in ionic liquids or polymers in the related art, the weight percentages of metal salts in matrices are about several percent by weight to about 40 wt %.

A halogen contained in the metal halide is at least one selected from the group consisting of chlorine, bromine, and iodine. The halogen may be, for example, chlorine and/or bromine.

An alkaline-earth metal contained in the metal halide is at least one selected from the group consisting of magnesium, calcium, strontium, and barium. The alkaline-earth metal may be, for example, magnesium.

A group 13 metal contained in the metal halide is at least one selected from the group consisting of aluminum, gallium, indium, and thallium. The group 13 metal may be, for example, aluminum or gallium.

The metal halide contains, for example, a solid-solution phase including metal sites occupied by the alkaline-earth metal and the group 13 metal at random.

The composition of the metal halide may be represented by, for example, general formula MM'$_a$X$_{2+3a}$, where M is one selected from the group consisting of Mg, Ca, Ba, and Sr, M' is one selected from the group consisting of Al, Ga, In, and Tl, X is one selected from the group consisting of Cl, Br, and I, and 0<a<3. By setting the molar ratio of the group 13 metal to the alkaline-earth metal to less than 3, the solid-solution phase can be stably formed to improve the alkaline-earth metal ion conductivity. The molar ratio a may even satisfy $0.2 \leq a \leq 2$. Alternatively, the molar ratio a may satisfy $1.5 \leq a \leq 2.5$.

The metal halide does not necessarily have a stoichiometric composition. The metal halide includes a metal halide consisting of only main constituent elements and a metal halide containing main constituent elements and a very small amount of impurity.

The metal halide may be an anhydrate or a hydrate.

The shape of the matrix 11 is not particularly limited to that illustrated in FIG. 1. Various modifications of the matrix 11 will be described below.

1-3. Inorganic Oxide Filler

The volume percentage of the inorganic oxide filler 12 in the solid electrolyte 10 may be 1 vol % or more and less than 95 vol % or may be 2 vol % or more and 80 vol % or less. The volume percentage of the inorganic oxide filler 12 is, for example, about 10 vol %. The adjustment of the volume percentage of the inorganic oxide filler 12 in an appropriate range may provide a large interfacial area between the metal halide and the inorganic oxide filler 12 to increase the connection of vacancies and/or the space-charge layers formed in the vicinities of the interfaces, thereby improving the ionic conductivity.

The inorganic oxide filler 12 contains an inorganic oxide functioning as a solid acid or solid base. Examples of the inorganic oxide include aluminum oxide, silicon oxide, magnesium oxide, zinc oxide, boron oxide, titanium oxide, niobium oxide, tin oxide, and zirconium oxide. The inorganic oxide is, for example, aluminum oxide.

The inorganic oxide does not necessarily have a stoichiometric composition. The inorganic oxide includes an inorganic oxide consisting of only main constituent elements and an inorganic oxide containing main constituent elements and a very small amount of impurity. Each of the particles of the inorganic oxide filler 12 may contain two or more substances. Two or more inorganic oxide fillers 12 having different materials from each other may also be used.

The shape of the inorganic oxide filler 12 is not particularly limited to that illustrated in FIG. 1. Examples of the shape of the inorganic oxide filler 12 include nanoparticles, nanowires, nanotubes, and nanoplates. The inorganic oxide filler 12 may also be composed of a mesoporous material as described below. These shapes may result in an increase in the interfacial area between the metal halide and the inorganic oxide filler 12 to increase the connection of the vacancies and/or the space-charge layers formed in the vicinities of the interfaces, thereby improving the ionic conductivity.

In the case where the inorganic oxide filler 12 is formed of nanoparticles, the shape thereof is not limited to a spherical shape and may be another shape such as a scale-like shape or fibrous shape. The average particle size of the nanoparticles is, but not particularly limited to, for example, 2 nm or more and 1 μm or less. The average particle size may be 200 nm or less and even 50 nm or less. A smaller particle size results in a higher surface area per unit volume and thus results in an improvement in the ionic conductivity of the solid electrolyte 10. The average particle size of the nanoparticles is determined by measuring the long-axis lengths of particles (for example, freely-selected 10 particles) in a transmission electron micrograph (TEM image) obtained with a transmission electron microscope (TEM) and calculating the average of the long-axis lengths.

In the case where the inorganic oxide filler 12 is formed of nanowires or nanotubes, the average diameter and the average length thereof are not particularly limited. For example, the average diameter is 2 nm or more and 1 μm or less, and the average length is 100 nm or more and 10 mm or less. The average diameter of the nanowires and the nanotubes may be 200 nm or less, even 50 nm or less. The average diameter and the average length are calculated from a TEM image in the same way as described above.

In the case where the inorganic oxide filler 12 is formed of nanoplates, the shape thereof may be, but not particularly limited to, for example, a circular shape or polygonal shape. The nanoplates have an average thickness of, for example, 2 nm or more and 1 μm or less. The average thickness may be 200 nm or less, even 50 nm or less. The average thickness is calculated from a TEM image in the same way as described above.

In the case where the inorganic oxide filler 12 is composed of a mesoporous material, the mesoporous material may have any shape as long as it includes pores. The shape of the pores may be, for example, a spherical shape or tubular shape. The network of the pores may be formed from one end to the other end of the mesoporous material. Alternatively, each pore may penetrate through the mesoporous material from one end to the other end of the mesoporous material. In this case, the alkaline-earth metal ions can move through these pores. The average pore size is, but not particularly limited to, for example, 2 nm or more and 50 nm or less. The average pore size is calculated from a TEM image in the same way as described above.

1-4. Other Structures of Solid Electrolyte

Figure 2B:
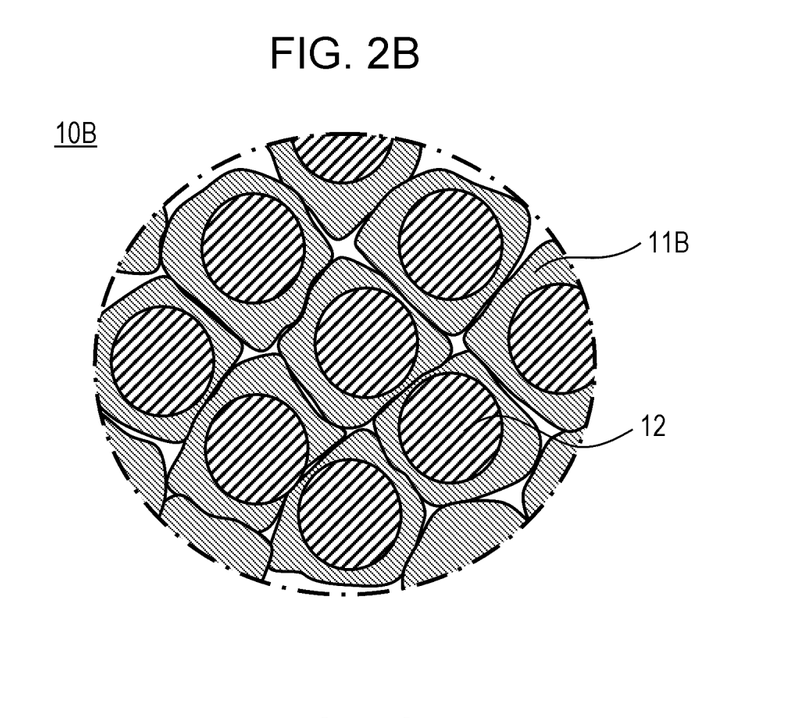
FIG. 2B is a schematic cross-sectional view of the structure of a solid electrolyte according to a second modification of an embodiment.
Figure 2C:
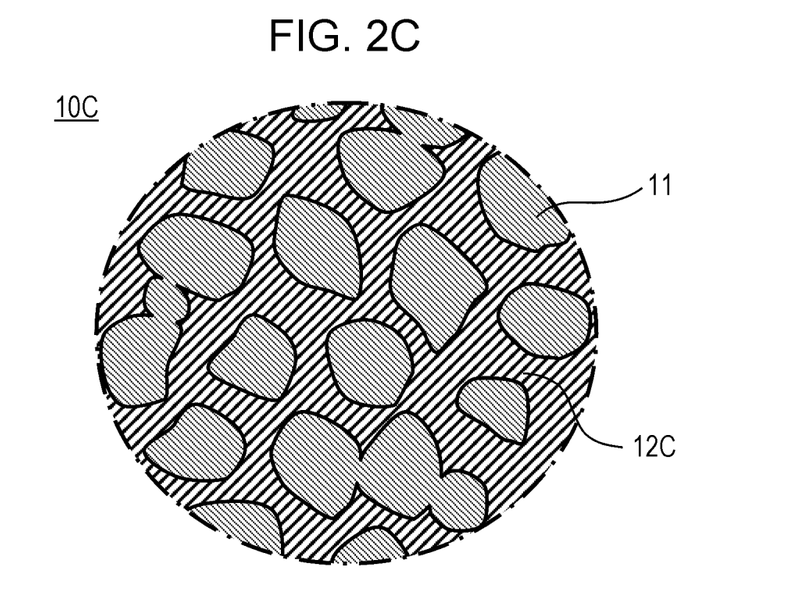
FIG. 2C is a schematic cross-sectional view of the structure of a solid electrolyte according to a third modification of an embodiment.

The shape of the matrix 11 and the shape of the inorganic oxide filler are not limited to examples illustrated in FIG. 1. FIGS. 2A to 2C illustrate solid electrolytes according to various modifications of this embodiment.

FIG. 2A illustrates the structure of a solid electrolyte 10A according to a first modification of this embodiment. In FIG. 2A, a matrix 11A is formed of a powder. For example, a powder containing the metal halide as a solid salt is mixed with inorganic oxide particles, and then the resulting mixture is pressed to bond the powder and the inorganic oxide particles together. This results in a composite material, serving as the solid electrolyte 10A, that contains a solid phase, i.e., the matrix 11A, containing the metal halide as a solid salt and that contains the inorganic oxide particles, i.e., the inorganic oxide filler 12, bonded to the solid phase. The matrix 11A illustrated in FIG. 2A includes gaps.

FIG. 2B illustrates the structure of a solid electrolyte 10B according to a second modification of this embodiment. In FIG. 2B, a matrix 11B is formed of coatings that cover the surfaces of the respective particles of the inorganic oxide filler 12. For example, the metal halide is dissolved in a solvent. The resulting solution is mixed with inorganic oxide particles to coat the surfaces of the inorganic oxide particles with the solution containing the metal halide as a dissolved salt. Drying the mixture forms coatings containing the metal halide as a solid salt on the surfaces of the respective inorganic oxide particles to bond the coated inorganic oxide particles together. This results in a composite material, serving as the solid electrolyte 10B, containing the inorganic oxide particles, i.e., the inorganic oxide filler 12, and a solid phase including the coatings bonded together, i.e., the matrix 11B. The matrix 11B illustrated in FIG. 2B includes gaps.

FIG. 2C illustrates the structure of a solid electrolyte 10C according to a third modification of this embodiment. In FIG. 2C, an inorganic oxide filler 12C is formed of a mesoporous material. The mesoporous material is disposed in the matrix 11. The pores of the mesoporous material are filled with the matrix 11. For example, the metal halide is dissolved in a solvent. The mesoporous material is impregnated with the resulting solution and then dried. This results in a composite material, serving as the solid electrolyte 10C, that contains a solid phase containing the metal halide as a solid salt, i.e., the matrix 11, and that contains the mesoporous material of the inorganic oxide disposed in the solid phase, i.e., the inorganic oxide filler 12C.

In the solid electrolyte 10B illustrated in FIG. 2B, almost all surfaces of the particles of the inorganic oxide filler 12 are in contact with the matrix 11B. This results in an increased area of the interfaces between the inorganic oxide filler 12 and the matrix 11B. Thus, a large number of pores and/or large area of the space-charge layers are provided at these interfaces, thereby resulting in improved ionic conductivity. The same is true for the solid electrolyte 10C illustrated in FIG. 2C.

1-5. Method for Producing Solid Electrolyte

An example of a method for producing the solid electrolyte 10A illustrated in FIG. 2A will be described below.

A predetermined amount of the metal halide and a predetermined amount of the inorganic oxide particles are weighed. At this time, a halide of an alkaline-earth metal and a halide of a group 13 metal, serving as raw materials of the metal halide, may be separately weighed. The weighed raw materials are well mixed in a mortar. The mixture is sealed in a bottle in a vacuum atmosphere or in a bottle filled with an inert atmosphere such as a nitrogen atmosphere or an argon atmosphere. The bottle is placed in a heating oven. The mixture is fired and reacted.

By the foregoing process, the solid electrolyte 10A illustrated in FIG. 2A is produced.

An example of a method for producing the solid electrolyte 10B illustrated in FIG. 2B will be described below.

A predetermined amount of the metal halide and a predetermined amount of the inorganic oxide particles are weighed. At this time, a halide of an alkaline-earth metal and a halide of a group 13 metal, serving as raw materials of the metal halide, may be separately weighed. The weighed metal halide is dissolved in a solvent to prepare a solution. The inorganic oxide particles are dispersed in a dispersion medium to prepare a dispersion. The solution and the dispersion are mixed together. The resulting mixture is sufficiently stirred to prepare a mixture containing the metal halide as a dissolved salt and the inorganic oxide particles dispersed therein.

Any solvent may be used as the solvent as long as it can sufficiently dissolve the metal halide. Examples of the solvent include hydrocarbon-based solvents, alcohol-based solvent, ester-based solvents, ether-based solvents, and ketone-based solvents. The solvent is, for example, methanol, ethanol, tetrahydrofuran, dimethyl ether, or acetonitrile.

Any dispersion medium may be used as the dispersion medium as long as it can sufficiently disperse the inorganic oxide particles. The dispersion medium may be a material the same as, for example, the solvent described above. The inorganic oxide particles may be subjected to pretreatment or preliminary treatment with a dispersant or surfactant before being dispersed in the dispersion medium. The materials of the dispersant and the surfactant may be, but are not particularly limited to, for example, silane coupling agents.

The resulting mixture is heated on a hot plate with stirring to remove the solvent component from the mixture, so that the coatings containing the metal halide as a solid salt are formed on the surfaces of the inorganic oxide particles to bond the coated inorganic oxide particles together.

The heating temperature is appropriately set, depending on the solvent. The heating temperature is set at, for example, a temperature equal to or lower than the boiling point of the solvent and/or the dispersion medium. This can inhibit the bumping and scattering of the mixture.

The resulting solid matter may be further dried with a vacuum drying oven. This can completely remove the residual solvent adsorbed on the solid matter. In this case, the heating temperature may be, for example, a temperature equal to or higher than the boiling point of the solvent.

The resulting solid matter may be ground in a mortar, thereby disintegrating the aggregation.

By the foregoing process, the solid electrolyte 10B illustrated in FIG. 2B is produced.

The foregoing process is performed in, for example, an inert atmosphere, such as a nitrogen atmosphere or an argon atmosphere, or vacuum atmosphere. This inhibits the reaction of the metal halide with water and/or oxygen to inhibit the formation of a by-product that decreases the ionic conductivity.

The method for producing the solid electrolyte is not limited to the method described above.

For example, the metal halide and the inorganic oxide filler 12 may be mixed together by a known mixing method. Examples of the mixing method include a mixing method with a mortar, a mixing method by a mechanical milling method, a mixing method with a bead mill, and a mixing method with a jet mill. The mixing method may be dry mixing or wet mixing. These mixing methods can also be employed as, for example, methods for producing the solid electrolyte 10A illustrated in FIG. 2A.

For example, the inorganic oxide filler 12 may be impregnated with the metal halide by a known impregnation method. Examples of the impregnation method include chemical liquid-phase impregnation methods, such as liquid-phase impregnation methods and melt impregnation methods, and chemical vapor phase impregnation methods. In a liquid-phase impregnation method, for example, the inorganic oxide filler 12 is impregnated with a solution containing the metal halide dissolved therein. In a melt impregnation method, for example, the inorganic oxide filler 12 is impregnated with the molten metal halide. In a chemical vapor-phase impregnation method, for example, the inorganic oxide filler 12 is impregnated with the gaseous metal halide. These impregnation methods can be employed as, for example, methods for producing the solid electrolyte 10C illustrated in FIG. 2C.

For example, the matrix 11 and/or the inorganic oxide filler 12 may be formed by a known film-forming method. Examples of the known film-forming method include sol-gen methods, metallo-organic compound decomposition (MOD) methods, atomic layer deposition (ALD) methods, chemical vapor deposition (CVD) methods, and liquid-phase film-forming methods.

2. Secondary Battery

Figure 3:
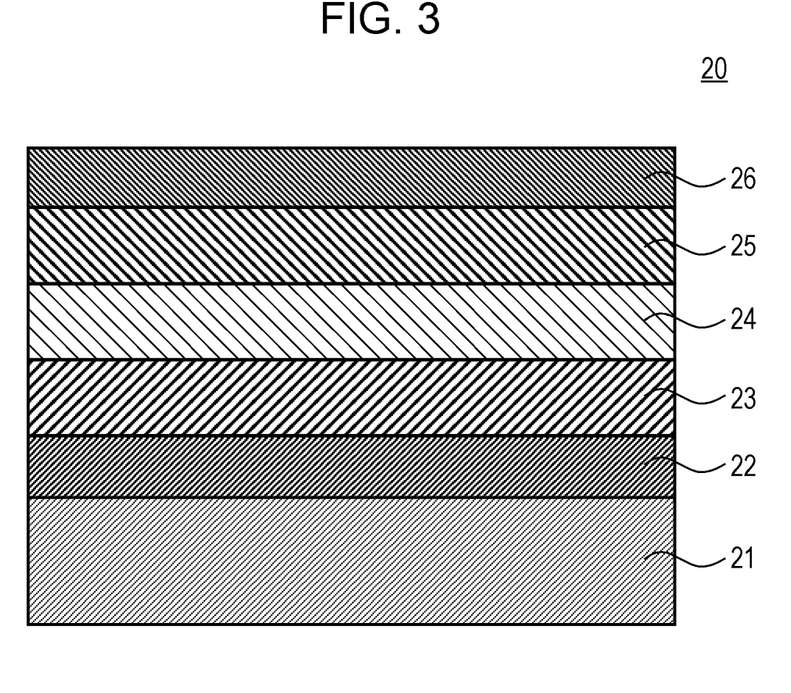
FIG. 3 is a schematic cross-sectional view of an example of the structure of a secondary battery according to an embodiment.

FIG. 3 is a schematic cross-sectional view of an example of the structure of a secondary battery 20 according to an embodiment.

The secondary battery 20 includes a substrate 21, a positive electrode current collector 22, a positive electrode 23, a solid electrolyte 24, a negative electrode 25, and a negative electrode current collector 26. The solid electrolyte 24 may be arranged between the positive electrode 23 and the negative electrode 25. An intermediate layer may be provided therebetween. Alkaline-earth metal ions can move between the positive electrode 23 and the negative electrode 25 through the solid electrolyte 24.

The substrate 21 may be an insulating substrate or a conductive substrate. The substrate 21 may be a substrate that remains unchanged when an inorganic or organic layer is formed thereon. Examples of the substrate 21 include glass substrates, plastic substrates, polymer films, silicon substrates, metal plates, metal foil sheets, and laminates thereof. The substrate 21 may be a commercially available substrate or a substrate produced by a known method.

The positive electrode current collector 22 is composed of an electronic conductor that does not change chemically in the presence of an ionic conductor contained in the positive electrode 23 in the range of the operating voltage of the secondary battery 20. The operating voltage of the positive electrode current collector 22 may be in the range of, for example, +1.5 V to +4.5 V with respect to the standard redox potential of the alkaline-earth metal. The material of the positive electrode current collector 22 is, for example, a metal or an alloy. More specifically, the material of the positive electrode current collector 22 may be a metal or an alloy containing at least one metal element selected from the group consisting of copper, chromium, nickel, titanium, platinum, gold, aluminum, tungsten, iron, and molybdenum. The material of the positive electrode current collector 22 may be, for example, aluminum, an aluminum alloy, platinum, or gold in view of conductivity, resistance to the ionic conductor, and the redox potential. In the case where the substrate 21 is composed of a conductive material and also serves as the positive electrode current collector 22, the positive electrode current collector 22 may be omitted.

The positive electrode current collector 22 may be formed of a transparent conductive film. Examples of the transparent conductive film include indium-tin oxide (ITO), indium-zinc oxide (IZO), fluorine-doped tin oxide (FTO), antimony-doped tin oxide (ATO), indium oxide ($In_2O_3$), tin oxide ($SnO_2$), and Al-containing ZnO.

The positive electrode current collector 22 may be formed of a laminated film including the metal and/or the transparent conductive film.

The positive electrode 23 contains a positive electrode active material capable of absorbing and releasing the alkaline-earth metal ions.

For example, in the case where the alkaline-earth metal is magnesium, any material may be used as the positive electrode active material as long as it absorbs and releases magnesium ions. In this case, examples of the positive electrode active material include metal oxides, polyanionic salt compounds, sulfides, chalcogenide compounds, and hydrides. Examples of the metal oxides include transition metal oxides such as $V_2O_5$, $MnO_2$, and $MoO_3$ and magnesium composite oxides such as $MgCoO_2$ and $MgNiO_2$. Examples of the polyoanionic salt compounds include $MgCoSiO_4$, $MgMnSiO_4$, $MgFeSiO_4$, $MgNiSiO_4$, $MgCo_2O_4$, and $MgMn_2O_4$. An example of the sulfides is $Mo_6S_8$. An example of the chalcogenide compounds is $Mo_9Se_{11}$.

For example, in the case where the alkaline-earth metal is calcium, any material may be used as the positive electrode active material as long as it absorbs and releases calcium ions. In this case, examples of the positive electrode active material include metal oxides, polyanionic salt compounds, sulfides, chalcogenide compounds, hydrides, and complexes. Examples of the metal oxides include transition metal oxides such as $V_2O_5$ and calcium composite oxides such as $CaCoO_2$. Examples of the polyoanionic salt compounds include $CaCoSiO_4$, $CaMnSiO_4$, $CaFeSiO_4$, and $CaNiSiO_4$. An example of the complexes is $K_2BaFe(CN)_6$.

For example, in the case where the alkaline-earth metal is strontium, any material may be used as the positive electrode active material as long as it absorbs and releases strontium ions. In this case, examples of the positive electrode active material include metal oxides, polyanionic salt compounds, sulfides, chalcogenide compounds, and hydrides. Examples of the metal oxides include transition metal oxides such as $V_2O_5$ and strontium composite compounds such as $SrFeO_2$. Examples of the polyoanionic salt compounds include $SrCoSiO_4$, $SrMnSiO_4$, $SrFeSiO_4$, and $SrNiSiO_4$.

For example, in the case where the alkaline-earth metal is barium, any material may be used as the positive electrode active material as long as it absorbs and releases barium ions. In this case, examples of the positive electrode active material include metal oxides, polyanionic salt compounds, sulfides, chalcogenide compounds, and hydrides. Examples of the metal oxides include transition metal oxides such as $V_2O_5$ and barium composite compounds such as $BaCoO_2$. Examples of the polyoanionic salt compounds include $BaCoSiO_4$, $BaMnSiO_4$, $BaFeSiO_4$, and $BaNiSiO_4$.

The positive electrode active material is, for example, a crystalline material. The positive electrode 23 may contain two or more positive electrode active materials.

The positive electrode 23 may contain, for example, a conductive agent and a binder, as needed.

Any material may be used as the conductive agent as long as it is an electron conductive agent. Examples of the conductive agent include carbon materials, metals, and conductive polymers. Examples of the carbon materials include graphites such as natural graphites, e.g., massive graphite and flake graphite, and artificial graphites, acetylene black, carbon black, Ketjenblack, carbon whiskers, needle coke, and carbon fibers. Examples of the metal include copper, nickel, aluminum, silver, and gold. These materials may be used alone or in combination as a mixture of two or more. The conductive agent may be, for example, carbon black or acetylene black in view of electron conductivity and coatability.

Any binder may be used as long as it functions to hold the particles of the active material and the particles of the conductive agent. Examples of the binder include fluorine-containing resins such as polytetrafluoroethylene (PTFE), poly(vinylidene fluoride) (PVdF), and fluorine-containing rubber, thermoplastic resins such as polypropylene and polyethylene, ethylene-propylene-diene terpolymer rubber (EPDM), sulfonated EPDM rubber, and natural butyl rubber (NBR). These materials may be used alone or in combination as a mixture of two or more. The binder may be, for example, an aqueous dispersion of a cellulosic material or styrene-butadiene rubber (SBR).

Examples of a solvent in which the positive electrode active material, the conductive agent, and the binder are dispersed include N-methylpyrrolidone, dimethylformamide, dimethylacetamide, methyl ethyl ketone, cyclohexanone, methyl acetate, methyl acrylate, diethylenetriamine, N,N-dimethylaminopropylamine, ethylene oxide, and tetrahydrofuran. For example, a dispersant and/or a thickener may be added to the solvent. Examples of the thickener include carboxymethyl cellulose and methylcellulose.

For example, the positive electrode 23 is formed as follows: The positive electrode active material, the conductive agent, and the binder are mixed together. An appropriate solvent is added to the resulting mixture to form a positive electrode material in paste form. The positive electrode material is applied to a surface of the positive electrode current collector and dried, thereby forming the positive electrode 23. The positive electrode material may be pressed in order to increase the current density.

The thickness of the positive electrode 23 is, but not particularly limited to, for example, 1 μm or more and 100 μm or less.

The solid electrolyte 24 is the same as, for example, any of the solid electrolytes 10, 10A, 10B, and 10C described above. Thus, the description is not redundantly repeated.

The negative electrode 25 contains a negative electrode active material capable of absorbing and releasing the alkaline-earth metal ions. Alternatively, the negative electrode 25 is capable of dissolving and precipitating the alkaline-earth metal as a negative electrode active material.

For example, in the case where the alkaline-earth metal is magnesium, examples of the negative electrode active material include metals, alloys, sulfides, carbon, organic compounds, inorganic compounds, metal complexes, and organic polymer compounds. Examples of the carbon include graphite and non-graphite carbon such as hard carbon and coke. Examples of the metals include magnesium, tin, bismuth, and antimony. Examples of the alloys include alloys of magnesium and at least one selected from aluminum, silicon, gallium, zinc, tin, manganese, bismuth, and antimony.

For example, in the case where the alkaline-earth metal is calcium, examples of the negative electrode active material include metals, alloys, sulfides, carbon, organic compounds, inorganic compounds, metal complexes, and organic polymer compounds. Examples of the carbon include graphite and non-graphite carbon such as hard carbon and coke. Examples of the metals include calcium, tin, bismuth, and antimony. Examples of the alloys include alloys of calcium and at least one selected from aluminum, silicon, gallium, germanium, zinc, tin, manganese, bismuth, and antimony.

For example, in the case where the alkaline-earth metal is strontium, examples of the negative electrode active material include metals, alloys, sulfides, carbon, organic compounds, inorganic compounds, metal complexes, and organic polymer compounds. Examples of the carbon include graphite and non-graphite carbon such as hard carbon and coke. Examples of the metals include strontium, tin, bismuth, and antimony. Examples of the alloys include alloys of strontium and at least one selected from aluminum, silicon, gallium, germanium, zinc, tin, manganese, bismuth, and antimony.

For example, in the case where the alkaline-earth metal is barium, examples of the negative electrode active material include metals, alloys, sulfides, carbon, organic compounds, inorganic compounds, metal complexes, and organic polymer compounds. Examples of the carbon include graphite and non-graphite carbon such as hard carbon and coke. Examples of the metals include barium, tin, bismuth, and antimony. Examples of the alloys include alloys of barium and at least one selected from aluminum, silicon, gallium, germanium, zinc, tin, manganese, bismuth, and antimony.

The negative electrode 25 may contain two or more negative electrode active materials.

The negative electrode 25 may contain, for example, a conductive agent and a binder, as needed. The conductive agent, the binder, the solvent, and the thickener used for the positive electrode 23 can be appropriately used for the negative electrode 25.

The thickness of the negative electrode 25 is, but not particularly limited to, for example, 1 μm or more and 50 μm or less.

The negative electrode current collector 26 is composed of an electronic conductor that does not change chemically in the presence of an ionic conductor contained in the negative electrode 25 in the range of the operating voltage of the secondary battery 20. The operating voltage of the negative electrode current collector 26 may be in the range of, for example, 0 V to +1.5 V with respect to the standard redox potential of the alkaline-earth metal. The material for the positive electrode current collector 22 can be appropriately used for the negative electrode current collector 26.

The positive electrode current collector 22, the positive electrode 23, the negative electrode 25, and the negative electrode current collector 26 can be formed by, for example, a physical deposition method or chemical deposition method. Examples of the physical deposition method include a sputtering method, a vacuum deposition method, an ion plating method, and a pulsed laser deposition (PLD) method. Examples of the chemical deposition method include an atomic layer deposition (ALD) method, a chemical vapor deposition (CVD) method, a liquid-phase film-forming method, a sol-gel method, a metallo-organic compound decomposition (MOD) method, a spray pyrolysis decomposition (SPD) method, a doctor blade method, a spin coating method, and a printing technique. Examples of the CVD method include a plasma-enhanced CVD method, a thermal CVD method, and a laser CVD method. An example of the liquid-phase film-forming method is wet plating. Examples of the wet plating include electroplating, immersion plating, and electroless plating.

The positive electrode current collector 22 and the negative electrode current collector 26 having a plate-like shape or foil-like shape can also be used.

A method for producing the secondary battery 20 is not particularly limited as long as the foregoing secondary battery 20 can be produced. A similar method to a common method for producing a secondary battery may be employed. For example, the material of the positive electrode 23, the material of the solid electrolyte 24, and the material of the negative electrode 25 are pressed in sequence to produce a secondary battery element. This secondary battery element is placed in a battery case. The battery case is sealed by crimping to provide the secondary battery 20.

The secondary battery 20 may have, for example, a rectangular shape, a circular shape, an elliptic shape, or a hexagonal shape in plan view. The secondary battery 20 may have a cylindrical, prismatic, button-like, coin-like, or flat-shaped structure.

3. Experimental Result

3-1. First Experiment

In a first experiment, samples of various solid electrolytes 10 were produced, each of the samples containing aluminum oxide as the inorganic oxide filler 12 and containing a metal halide that was composed of magnesium, gallium, and chlorine, i.e., a metal chloride, and that served as the matrix 11. The ionic conductivity thereof was evaluated.

[3-1-1. Production of Sample]

Various samples were produced by a procedure described below.

Anhydrous magnesium chloride ($MgCl_2$), anhydrous gallium chloride ($GaCl_3$), and aluminum oxide ($Al_2O_3$) were provided. The aluminum oxide was formed of particles having an average particle size of 31 nm. $MgCl_2$ and $GaCl_3$ were weighed in such a manner that the molar ratio of Ga to Mg was 2. $Al_2O_3$ was weighed in such a manner that the volume percentage of $Al_2O_3$ was 1 vol % with respect to the total volume of $MgCl_2$, $GaCl_3$, and $Al_2O_3$. The weighed raw materials were mixed together in a mortar. The resulting mixture was sealed in a bottle. The bottle was placed in a heating oven. The mixture was heated at 120° C. for 18 hours to give a solid electrolyte of Example 1.

Solid electrolytes of Examples 2 to 7 were produced in the same way as in Example 1, except that different volume percentages of $Al_2O_3$ were used. The volume percentages of $Al_2O_3$ in the solid electrolytes of Examples 2 to 7 were 2, 5, 10, 20, 50, and 80 vol %.

A solid electrolyte of Comparative example 1 was produced in the same way as in Example 1, except that $Al_2O_3$ was not mixed.

Solid electrolytes of Examples 8 and 9 were produced in the same way as in Example 1, except that different molar ratios of Ga to Mg were used and that the volume percentage of $Al_2O_3$ was 10 vol %. The molar ratios of Ga to Mg in the solid electrolytes of Examples 8 and 9 were 0.5 and 1, respectively.

A solid electrolyte of Comparative example 2 was produced in the same way as in Example 8, except that $Al_2O_3$ was not mixed. A solid electrolyte of Comparative example 3 was produced in the same way as in Example 9, except that $Al_2O_3$ was not mixed.

A solid electrolyte of Comparative example 4 was produced in the same way as in Examples 4, 8, and 9, except that $GaCl_3$ was not mixed.

Table 1 presents the compositions of the metal halides, the molar ratios of Ga to Mg, and the volume percentages (%) of $Al_2O_3$ in the solid electrolytes of Examples 1 to 9 and Comparative examples 1 to 4.

TABLE 1

| | Metal halide | | $Al_2O_3$ | Ionic conductivity |
|---|---|---|---|---|
| | Composition | Mg:Ga | (vol %) | (S/cm) |
| Example 1 | $MgGa_2Cl_8$ | 1:2 | 1 | $2.0 \times 10^{-7}$ |
| Example 2 | $MgGa_2Cl_8$ | 1:2 | 2 | $5.7 \times 10^{-7}$ |
| Example 3 | $MgGa_2Cl_8$ | 1:2 | 5 | $6.8 \times 10^{-7}$ |
| Example 4 | $MgGa_2Cl_8$ | 1:2 | 10 | $1.8 \times 10^{-6}$ |
| Example 5 | $MgGa_2Cl_8$ | 1:2 | 20 | $3.7 \times 10^{-7}$ |
| Example 6 | $MgGa_2Cl_8$ | 1:2 | 50 | $8.1 \times 10^{-7}$ |
| Example 7 | $MgGa_2Cl_8$ | 1:2 | 80 | $6.5 \times 10^{-7}$ |
| Comparative example 1 | $MgGa_2Cl_8$ | 1:2 | 0 | $1.0 \times 10^{-7}$ |
| Example 8 | $MgGa_{0.5}Cl_{3.5}$ | 1:0.5 | 10 | $1.4 \times 10^{-8}$ |
| Comparative example 2 | $MgGa_{0.5}Cl_{3.5}$ | 1:0.5 | 0 | $1.1 \times 10^{-9}$ |
| Example 9 | $MgGaCl_5$ | 1:1 | 10 | $7.3 \times 10^{-9}$ |
| Comparative example 3 | $MgGaCl_5$ | 1:1 | 0 | $5.1 \times 10^{-10}$ |
| Comparative example 4 | $MgCl_2$ | — | 10 | unmeasurable |

[3-1-2. Ionic Conductivity]

The ionic conductivity of each of the solid electrolytes of Examples 1 to 9 and Comparative examples 1 to 4 was evaluated by alternating current impedance measurement.

Evaluation pellets were produced from the solid electrolytes by a procedure as described below. An appropriate amount of each solid electrolyte sample was weighed in a glove box filled with a nitrogen atmosphere. The weighed samples were placed in poly(ethylene carbonate) tubes (PC tubes having an inside diameter of 10 mm, an outside diameter of 30 mm, and a height of 20 mm). Each of the samples was held by a jig composed of stainless steel (SUS304, specified by Japanese Industrial Standards). Each sample was pressed at a pressure of 6 N/cm² with a uniaxial pressing machine (P-16B, available from RIKEN SEIKI) via the jig to form a pellet having a diameter of 10 mm and a freely-selected thickness. The jig was set to another jig for fixation with the pellet held. Thus, the pellet was fixed in a state being pressed at a pressure of 5 N/cm². The pellet was introduced together with the jig into a gastight container while the state is maintained. The gastight container was filled with a nitrogen atmosphere, and the nitrogen atmosphere was maintained. Electrode terminals arranged outside the gastight container were electrically connected to the jig in the gastight container through lead lines.

The pellet of each sample was subjected to alternating current impedance measurement. An electrochemical measurement system (Modulab, available from Solartron Analytical) was used as a measurement device. An environmental tester (PR-2KP, available from Espec Corp.) was used as a constant-temperature unit. The alternating current impedance of each of the samples was measured at an alternating voltage of 50 to 200 mV in a frequency range of 0.01 Hz to 1 MHz at 25° C. This measurement revealed the resistance of the pellet of each sample in the direction normal to a main surface of the pellet. The resistance was converted into ionic conductivity, thereby providing the ionic conductivity of each of the solid electrolytes of Examples 1 to 9 and Comparative examples 1 to 4. Table 1 presents the results.

The solid electrolytes of Examples 1 to 7, in which the $Al_2O_3$ particles were contained, had higher ionic conductivity than the solid electrolyte of Comparative example 1, in which the $Al_2O_3$ particles were not contained. Similarly, the solid electrolytes of Examples 8 and 9, in which the $Al_2O_3$ particles were contained, had higher ionic conductivity than the solid electrolytes of Comparative examples 2 and 3, in which the $Al_2O_3$ particles were not contained. These results indicated that the $Al_2O_3$ particles contained in the solid electrolytes improved the ionic conductivity of the solid electrolytes.

The solid electrolytes of Examples 4, 8, and 9, in which the metal halides contained Ga, had higher ionic conductivity than the solid electrolyte of Comparative example 4, in which the metal halide did not contain Ga. These results indicated that Ga contained in the metal halides improved the ionic conductivity of the solid electrolytes. The solid electrolyte of Example 4, in which the molar ratio of Ga to Mg was 2, had the highest ionic conductivity among the solid electrolytes of Examples 4, 8, and 9.

3-2. Second Experiment

In a second experiment, samples of various solid electrolytes 10 were produced, each of the samples containing aluminum oxide as the inorganic oxide filler 12 and containing a metal halide that contained magnesium, gallium, chlorine, and bromine and that served as the matrix 11. The ionic conductivity thereof was evaluated.

[3-2-1. Production of Sample]

Various samples were produced by a procedure described below.

A solid electrolyte of Example 10 was produced in the same way as in Example 1, except that anhydrous magnesium bromide ($MgBr_2$) was used in place of anhydrous magnesium chloride ($MgCl_2$) and that the volume percentage of $Al_2O_3$ was 10 vol %.

A solid electrolyte of Comparative example 5 was produced in the same way as in Example 10, except that $Al_2O_3$ was not mixed.

A solid electrolyte of Example 11 was produced in the same way as in Example 1, except that anhydrous gallium bromide ($GaBr_3$) was used in place of anhydrous gallium chloride ($GaCl_3$) and that the volume percentage of $Al_2O_3$ was 10 vol %.

A solid electrolyte of Comparative example 6 was produced in the same way as in Example 11, except that $Al_2O_3$ was not mixed.

Table 2 presents the compositions of the metal halides, the molar ratios of Ga to Mg, and the volume percentages (%) of $Al_2O_3$ in the solid electrolytes of Examples 10 and 11 and Comparative examples 5 and 6.

TABLE 2

| | Metal halide | | $Al_2O_3$ | Ionic conductivity |
|---|---|---|---|---|
| | Composition | Mg:Ga | (vol %) | (S/cm) |
| Example 10 | $MgGa_2Br_2Cl_6$ | 1:2 | 10 | $2.1 \times 10^{-6}$ |
| Comparative example 5 | $MgGa_2Br_2Cl_6$ | 1:2 | 0 | $1.7 \times 10^{-6}$ |
| Example 11 | $MgGa_2Cl_2Br_6$ | 1:2 | 10 | $8.9 \times 10^{-8}$ |
| Comparative example 6 | $MgGa_2Cl_2Br_6$ | 1:2 | 0 | $8.2 \times 10^{-9}$ |

[3-2-2. Ionic Conductivity]

The ionic conductivity of each of the solid electrolytes of Examples 10 and 11 and Comparative examples 5 and 6 was evaluated in the same method as in the first experiment, except that the measurement temperature was 60° C. Table 2 also presents the results.

The solid electrolyte of Example 10, in which the $Al_2O_3$ particles were contained, had higher ionic conductivity than the solid electrolyte of Comparative example 5, in which the $Al_2O_3$ particles were not contained. Similarly, the solid electrolyte of Example 11, in which the $Al_2O_3$ particles were contained, had higher ionic conductivity than the solid electrolyte of Comparative example 6, in which the $Al_2O_3$ particles were not contained. These results indicated that the $Al_2O_3$ particles contained in the solid electrolytes improved the ionic conductivity of the solid electrolytes.

The results of Examples 10 and 11 indicates that the ionic conductivity is improved even if each of the metal halides contains the halogens. The results also suggest that the halogen contained in the metal halide is not limited only to chlorine.

3-3. Third Experiment

In a third experiment, samples of various solid electrolytes 10 were produced, each of the samples containing aluminum oxide as the inorganic oxide filler 12 and containing a metal halide that contained magnesium, aluminum, and chlorine, i.e., a metal chloride, and that served as the matrix 11. The ionic conductivity thereof was evaluated.

[3-3-1. Production of Sample]

Various samples were produced by a procedure described below.

Anhydrous magnesium chloride ($MgCl_2$), anhydrous aluminum chloride ($AlCl_3$), and aluminum oxide ($Al_2O_3$) were provided. The aluminum oxide was formed of particles having an average particle size of 31 nm. $MgCl_2$ and $AlCl_3$ were weighed in such a manner that the molar ratio of Al to Mg was 2. $Al_2O_3$ was weighed in such a manner that the volume percentage of $Al_2O_3$ was 50 vol % with respect to the total volume of $MgCl_2$, $AlCl_3$, and $Al_2O_3$. The weighed $MgCl_2$ and $AlCl_3$ were dissolved in tetrahydrofuran (THF) to prepare a 0.2 M solution. The weighed $Al_2O_3$ was dispersed in THF to prepare a 0.2 M dispersion. The solution and the dispersion were mixed together. The resulting mixture was sealed in a bottle under nitrogen and stirred in the bottle at 50° C. for 24 hours. The mixture was heated at 50° C. on a hot plate under stirring, thereby removing the solvent component from the mixture to give a solid containing the metal chloride and $Al_2O_3$, which was visually observed. The solid was vacuum-dried at 120° C. for 24 hours with a vacuum dryer to give a solid electrolyte of Example 12.

A solid electrolyte of Example 13 was produced in the same way as in Example 12, except that the volume percentage of $Al_2O_3$ was 80 vol %.

A solid electrolyte of Comparative example 7 was produced in the same way as in Example 12, except that $Al_2O_3$ was not mixed.

Solid electrolytes of Examples 14 and 15 were produced in the same way as in Example 10, except that different molar ratios of Al to Mg were used. The molar ratios of Al to Mg in the solid electrolytes of Examples 14 and 15 were 0.2 and 1, respectively.

A solid electrolyte of Comparative example 8 was produced in the same way as in Example 12, 14, and 15, except that $AlCl_3$ was not mixed.

Table 3 presents the compositions of the metal halides, the molar ratios of Al to Mg, and the volume percentages (%) of $Al_2O_3$ in the solid electrolytes of Examples 12 to 15 and Comparative examples 7 and 8.

TABLE 3

| | Metal halide | | $Al_2O_3$ | Ionic conductivity |
|---|---|---|---|---|
| | Composition | Mg:Al | (vol %) | (S/cm) |
| Example 12 | $MgAl_2Cl_8$ | 1:2 | 50 | $9.5 \times 10^{-8}$ |
| Example 13 | $MgAl_2Cl_8$ | 1:2 | 80 | $1.9 \times 10^{-9}$ |
| Comparative example 7 | $MgAl_2Cl_8$ | 1:2 | 0 | $7.1 \times 10^{-10}$ |
| Example 14 | $MgAl_{0.2}Cl_{2.6}$ | 1:0.2 | 50 | $1.6 \times 10^{-8}$ |
| Example 15 | $MgAlCl_5$ | 1:1 | 50 | $4.0 \times 10^{-8}$ |
| Comparative example 8 | $MgCl_2$ | — | 50 | $1.4 \times 10^{-8}$ |

[3-3-2. Ionic Conductivity]

The ionic conductivity of each of the solid electrolytes of Examples 12 to 15 and Comparative examples 7 and 8 was evaluated in the same method as in the first experiment, except that the measurement temperature was 40° C. Table 3 also presents the results.

The solid electrolytes of Examples 12 and 13, in which the $Al_2O_3$ particles were contained, had higher ionic conductivity than the solid electrolyte of Comparative example 7, in which the $Al_2O_3$ particles were not contained. The results indicated that the $Al_2O_3$ particles contained in the solid electrolytes improved the ionic conductivity of the solid electrolytes.

The solid electrolytes of Examples 12, 14, and 15, in which the metal halides contained Al, had higher ionic conductivity than the solid electrolyte of Comparative example 8, in which the metal halide did not contain Al. These results indicated that Al contained in the metal halides improved the ionic conductivity of the solid electrolytes. The solid electrolyte of Example 12, in which the molar ratio of Al to Mg was 2, had the highest ionic conductivity among the solid electrolytes of Examples 12, 14, and 15.

The results of Examples 12 to 15 indicates that the ionic conductivity is improved even if the group 13 metal contained in the metal halides is aluminum. The results also suggest that the group 13 metal contained in the metal halides is not limited only to gallium.

The method for producing the solid electrolytes of Examples 12 to 15 is different from that in Examples 1 to 11. Thus, these results suggest that a method for producing the solid electrolyte 10 is not limited to a particular method.

3-4. Supplement

The foregoing experimental results demonstrate that the solid electrolyte 10 containing the matrix 11 containing the magnesium halide and the inorganic oxide filler 12 that is in the form of particles has good ionic conductivity. This effect is attributed to the presence of the inorganic oxide filler 12; thus, it is presumed that the same effect is provided also in the case where another metal halide is used. As described above, the improvement in ionic conductivity may be attributed to the interfaces between the matrix 11 and the inorganic oxide filler 12; thus, the inorganic oxide filler 12 may have another shape as long as the interfaces can be ensured.

Any material of the filler may be used as long as it is used together with a metal halide to improve the alkaline-earth metal ion conductivity. The inventors have reported some materials having such effects in Japanese Patent Application No. 2017-046868. The contents of Japanese Patent Application No. 2017-046868 are incorporated in the present disclosure by reference.

In the foregoing experimental results, a similar tendency in the improvement in ionic conductivity is obtained, regardless of the type of the anion of the magnesium halide or the type of the inorganic oxide filler 12. Thus, it is presumed that, for example, even in the case where the matrix 11 contains different types of metal halides and/or where the inorganic oxide filler 12 contains different types of inorganic oxides, the solid electrolyte 10 has improved ionic conductivity.

What is claimed is:

1. A solid electrolyte comprising:
   a matrix comprising, as a main component of the matrix, a metal halide, said metal halide as a solid salt that is not dissolved in a polymer, wherein the metal halide contains an alkaline-earth metal and a group 13 metal; and
   at least one tiller located in the matrix,
   wherein the at least one filler contains an inorganic oxide, and the inorganic oxide includes at least one selected from the group consisting of aluminum oxide, silicon oxide, magnesium oxide, zinc oxide, boron oxide, titanium oxide, niobium oxide, tin oxide, and zirconium oxide.

2. The solid electrolyte according to claim 1, wherein the alkaline-earth metal is magnesium.

3. The solid electrolyte according to claim 1, wherein the group 13 metal is aluminum or gallium.

4. The solid electrolyte according to claim 1, wherein a halogen contained in the metal halide is at least one selected from the group consisting of chlorine, bromine, and iodine.

5. The solid electrolyte according to claim 1, wherein a molar ratio of the group 13 metal to the alkaline-earth metal in the metal halide is more than 0 and less than 3.

6. The solid electrolyte according to claim 1, wherein the at least one filler is formed as fine particles, which are dispersed in the matrix.

7. The solid electrolyte according to claim 6, wherein the fine particles have an average particle size of 2 nm or more and 1 μm or less.

8. The solid electrolyte according to claim 1, wherein a volume percentage of the at least one filler in the solid electrolyte is 1 vol % or more and less than 95 vol %.

9. The solid electrolyte according to claim 1, wherein the solid electrolyte is formed as a film having a thickness of 100 nm or more and 50 μm or less.

10. The solid electrolyte according to claim 1, wherein a content of the metal halide is more than 50 wt % of the matrix.

11. The solid electrolyte according to claim 1, wherein a content of the metal halide is more than 80 wt % of the matrix.

12. The solid electrolyte according to claim 1, wherein a content of the metal halide is more than 95 wt % of the matrix.

13. A secondary battery comprising:
a positive electrode;
a negative electrode; and
the solid electrolyte according to claim 1.

14. The secondary battery according to claim 13, wherein the positive electrode, the solid electrolyte, and the negative electrode are stacked.

\* \* \* \* \*